UNITED STATES PATENT OFFICE.

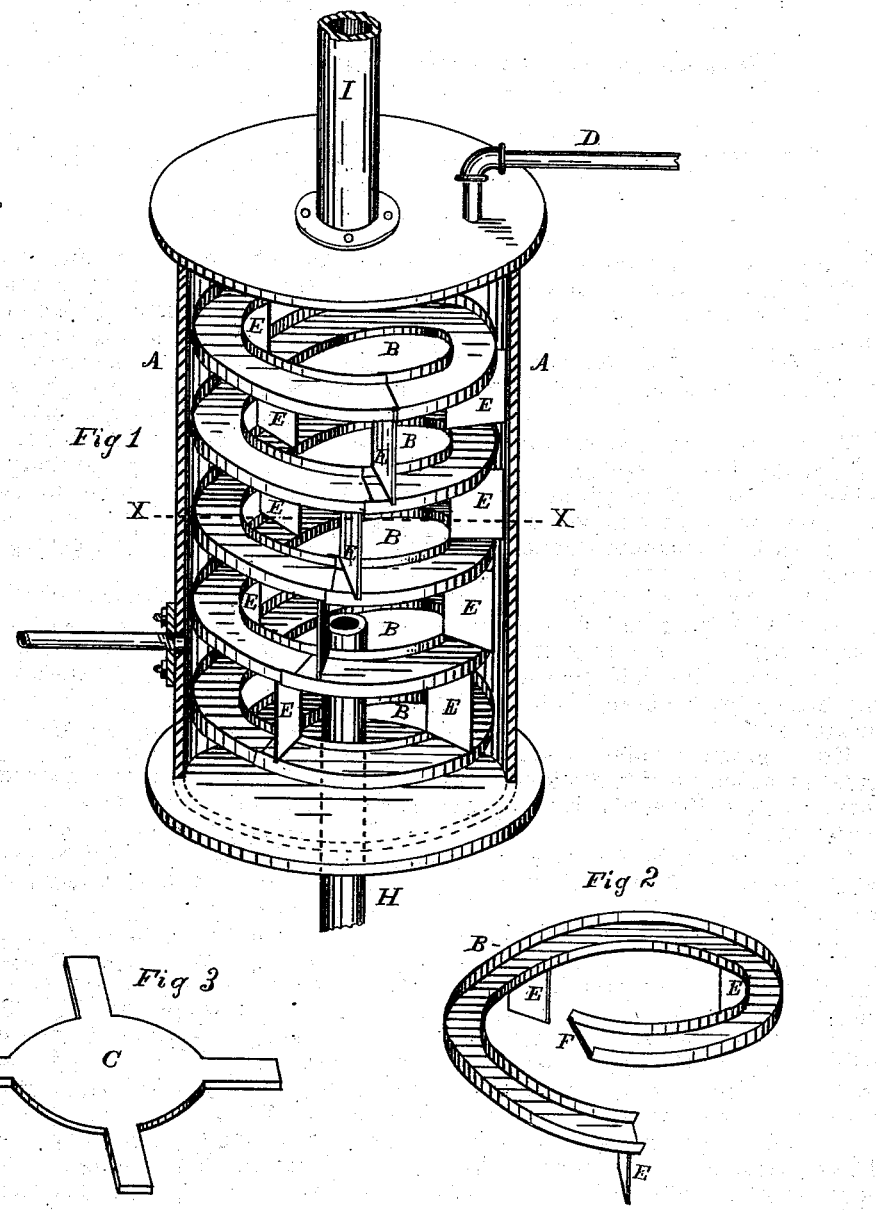

NICHOLAS R. NIXON, OF RICHMOND, INDIANA.

IMPROVEMENT IN HEATERS AND LIME-EXTRACTORS FOR STEAM-BOILERS.

Specification forming part of Letters Patent No. 155,620, dated October 6, 1874; application filed July 25, 1874.

*To all whom it may concern:*

Be it known that I, NICHOLAS R. NIXON, of Richmond, county of Wayne and State of Indiana, have invented certain Improvements in Heaters and Lime-Extractors for Steam-Boilers, of which the following is a specification:

My invention relates to an improvement in heaters and lime-extractors for steam-boilers, wherein I use a plain spiral or screw trough or water-passage, the upper end of the trough being placed immediately under the induction water-pipe, and passes in spiral form from top to bottom, this trough being made in sections, the sections having lugs attached to their bottom in such a manner as to support them one upon another when laid up within the shell of the heater, without any bolts or fastenings whatever.

The lengthened water-passage thus formed gives great length of travel to the water, while it is exposed to the action of the exhaust-steam within the heater.

Figure 1 is a side elevation of the spiral or screw trough, with the shell of the heater in vertical section. Fig. 2 is a top view of one of the sections of the spiral trough.

A A is the shell of the heater, and B B the spiral trough. The sections of the trough have a lip, F, at one end to catch the descending water from the section above it. The sections also have the lugs or projections E attached to them for the purpose of holding them in proper position one upon another when laid up within the shell of the heater. These sections, being simply laid up one upon another within the shell without any bolts or fastenings whatever, are very conveniently removed and replaced when occasion requires.

The length of trough and consequent travel of the water may be increased indefinitely by extending the height or diameter of the shell.

A small quantity of water comes in contact with the steam at any given point; therefore the water is thoroughly heated by the action of the steam, not only upon its greatly-extended surface, but underneath the trough as well, thus extracting the lime by keeping the water at a high temperature for a long distance before it reaches the boiler.

The two primary objects of this invention are, first, to expose a small quantity of water at any given point, but extend it for a long distance, thereby exposing it thoroughly to the action of the steam; and, secondly, constructing the whole in such manner as to be easily removed for cleaning, and replaced expeditiously.

Another distinctive feature of my invention is, that any of the heaters now in use may be easily converted into this kind of heater by simply removing the shelves and other fixtures, and replacing them with the trough of suitable dimensions, thereby saving much expense.

D is the induction water-pipe, and H is the induction steam-pipe. I is the exhaust-pipe leading from the heater.

The purified water is taken from the heater in any way and at any point to suit circumstances.

I am aware that spiral screw steam chambers or passages in condensers and heaters have been used. I am also aware that spiral water-passages having a descent have been applied to a series of separate shelves. Therefore I do not claim such broadly; but

What I claim, and desire to secure by Letters Patent, is—

A single plain trough made in screw form and laid up in sections within the shell of the heater, so as to form a spiral water-passage, in combination with the pipes D, H, and I, and lugs E, by which the sections are supported one upon another, substantially as shown and described.

NICHOLAS R. NIXON.

Witnesses:
 CALEB ELLIOTT,
 J. P. HOTCHKISS.